(12) United States Patent
Harmon et al.

(10) Patent No.: US 9,496,639 B2
(45) Date of Patent: Nov. 15, 2016

(54) ELECTRICAL CONNECTORS FOR VEHICLES

(71) Applicant: Grote Industries, Inc., Madison, IN (US)

(72) Inventors: Darren L. Harmon, Madison, IN (US); Alfredo Haros Hernandez, Nuevo Leon (MX); Leoncio Trejo Aguilar, Nuevo Leon (MX); Gumaro Carrizales Espinosa, Nuevo Leon (MX)

(73) Assignee: Grote Industries, Inc., Madison, IN (US)

( * ) Notice: Subject to any disclaimer, the term of this patent is extended or adjusted under 35 U.S.C. 154(b) by 35 days.

(21) Appl. No.: 14/657,304

(22) Filed: Mar. 13, 2015

(65) Prior Publication Data

US 2016/0268721 A1    Sep. 15, 2016

(51) Int. Cl.
| | |
|---|---|
| *H01R 13/52* | (2006.01) |
| *H01R 13/62* | (2006.01) |
| *H01R 13/74* | (2006.01) |
| *B60D 1/64* | (2006.01) |
| *H01R 24/66* | (2011.01) |
| *H01R 24/76* | (2011.01) |

(Continued)

(52) U.S. Cl.
CPC .............. *H01R 13/5202* (2013.01); *B60D 1/64* (2013.01); *H01R 13/62* (2013.01); *H01R 13/73* (2013.01); *H01R 13/745* (2013.01); *H01R 24/66* (2013.01); *H01R 24/76* (2013.01); *H01R 13/5219* (2013.01); *H01R 31/06* (2013.01); *H01R 2201/26* (2013.01)

(58) Field of Classification Search
CPC .............. H01R 13/5219; H01R 13/73; H01R 2201/26; H01R 31/06

USPC .......... 439/35, 271, 586, 587, 548, 556, 559
See application file for complete search history.

(56) References Cited

U.S. PATENT DOCUMENTS

| | | |
|---|---|---|
| 2,265,341 A | 12/1941 | Borchert |
| 2,496,208 A | 1/1950 | Hasselbaum |
| 2,652,445 A | 9/1953 | Simpson |

(Continued)

OTHER PUBLICATIONS

Phillips Industries. Qwik Tech Tips. vol. 3 Issue 7. Jul. 2013. What Exactly is SAE J560?, [online], [retrieved on Mar. 10, 2015]. Retrieved from the Internet <URL: www.phillipsqwiktechtips.com/QwikTechTips_July13.pdf>.

*Primary Examiner* — Abdullah Riyami
*Assistant Examiner* — Justin Kratt
(74) *Attorney, Agent, or Firm* — Woodard, Emhardt, Moriarty, McNett & Henry LLP (57) ABSTRACT

An electrical connection adapted for providing an electro-mechanical connection through a hole in a wall of a wheeled vehicle is disclosed. It includes an interior cable that meets SAE standard J560 and which includes an interior plug portion that has a 6-around-1 female electrical connector array. The electrical connection also includes a socket that meets SAE standard J560 and is adapted via a male interior 6-around-1 electrical connector array to provide an electrical connection to the interior cable. A gasket member is separately formed from the interior plug portion and includes a central opening sized and shaped to receive through it a connection of the interior cable plug and the socket. The gasket forms an uninterrupted water seal with the exterior side of the wall of the wheeled vehicle. One or more guide members are disclosed.

26 Claims, 7 Drawing Sheets

(51) Int. Cl.
*H01R 13/73* (2006.01)
*H01R 31/06* (2006.01)

(56) References Cited

U.S. PATENT DOCUMENTS

| | | |
|---|---|---|
| 3,573,720 A | 4/1971 | Reynolds |
| 4,312,553 A | 1/1982 | Lyckesjo |
| 4,531,796 A | 7/1985 | Gansert et al. |
| 4,770,644 A * | 9/1988 | Feder ............ B60D 1/64 |
| | | 439/166 |
| D328,279 S | 7/1992 | Couto et al. |
| 5,302,141 A | 4/1994 | O'Reilly et al. |
| 5,735,704 A | 4/1998 | Anthony |
| 5,739,592 A | 4/1998 | Rigsby et al. |
| 5,800,183 A | 9/1998 | Paul et al. |
| 6,450,833 B1 | 9/2002 | Brown, Jr. et al. |
| 6,483,200 B1 | 11/2002 | Jacobs |
| 6,554,626 B2 * | 4/2003 | Ramos, Jr. ............ H01R 13/405 |
| | | 439/144 |
| 6,743,025 B2 | 6/2004 | Howard |
| 7,086,897 B2 | 8/2006 | Montena |
| 7,435,093 B1 | 10/2008 | Harmon et al. |
| D646,229 S | 10/2011 | Guo |
| D647,059 S | 10/2011 | Guo |
| D647,060 S | 10/2011 | Guo |
| D647,061 S | 10/2011 | Guo |
| 8,192,216 B1 | 6/2012 | Puluc et al. |
| 8,251,732 B2 | 8/2012 | Armacost et al. |
| 8,540,527 B2 * | 9/2013 | Puluc ............ H01R 13/5219 |
| | | 439/271 |
| 2003/0054688 A1 * | 3/2003 | Howard ............ H01R 13/447 |
| | | 439/559 |

* cited by examiner

ELECTRICAL CONNECTORS FOR VEHICLES

BACKGROUND

The present invention relates to an electrical connection for providing an electro-mechanical connection between the interior side and exterior side of a wall of a wheeled vehicle.

A trailer connector is an electrical connector that connects a truck cab to a trailer to provide electricity and/or signals for automotive lighting and for other features. The electrical connectors that are used are standardized by the Society of Automotive Engineers (SAE) to allow for interchangeability between different trucks and trailers. SAE standard J560 provides requirements for seven pin electrical connectors for heavy duty vehicles. To provide a connection between the truck and the trailer, these electrical connectors often are positioned outside both the truck and trailer. If not properly connected and sealed, outside elements such as rain or snow may cause damage to the connection.

Thus, there is a need for improvement in this field.

SUMMARY

The claims, and only the claims, recite the invention. In summary, it may include an electrical connection adapted for providing an electro-mechanical connection through a hole in a wall of a wheeled vehicle. The electrical connection is adapted to connect with an exterior cable that includes a 6-around-1 female electrical connector array. The electrical connection also includes an interior cable that meets SAE standard J560 and which includes an interior plug portion that has a 6-around-1 female electrical connector array.

The electrical connection includes a socket that meets SAE standard J560 and is adapted via a male exterior 6-around-1 electrical connector array to provide an electrical connection to the exterior cable 6-around-1 female electrical connector array. The socket is also adapted via an interior 6-around-1 male electrical connector array to provide an electrical connection to the interior cable 6-around-1 female electrical connector array.

The electrical connection also may include a gasket member that is separately formed from the interior plug portion. The gasket member includes a circumferentially uninterrupted ring around a central opening sized and shaped to receive through it a connection of the interior cable plug and the socket. The gasket also includes a substantially planar rear surface adapted to contact and form an uninterrupted water seal with the exterior side of the wall. Recessing in the gasket is sized and shaped to receive a locking means.

The electrical connection may include one or more guide male member adapted to slide axially into one or more guide female member. The guide male member and the guide female member are located, prior to connection, axially between the interior plug portion and the socket.

Further forms, objects, features, aspects, benefits, advantages, and embodiments of the present invention will become apparent from a detailed description and drawings provided herewith.

DESCRIPTION OF THE SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 1:
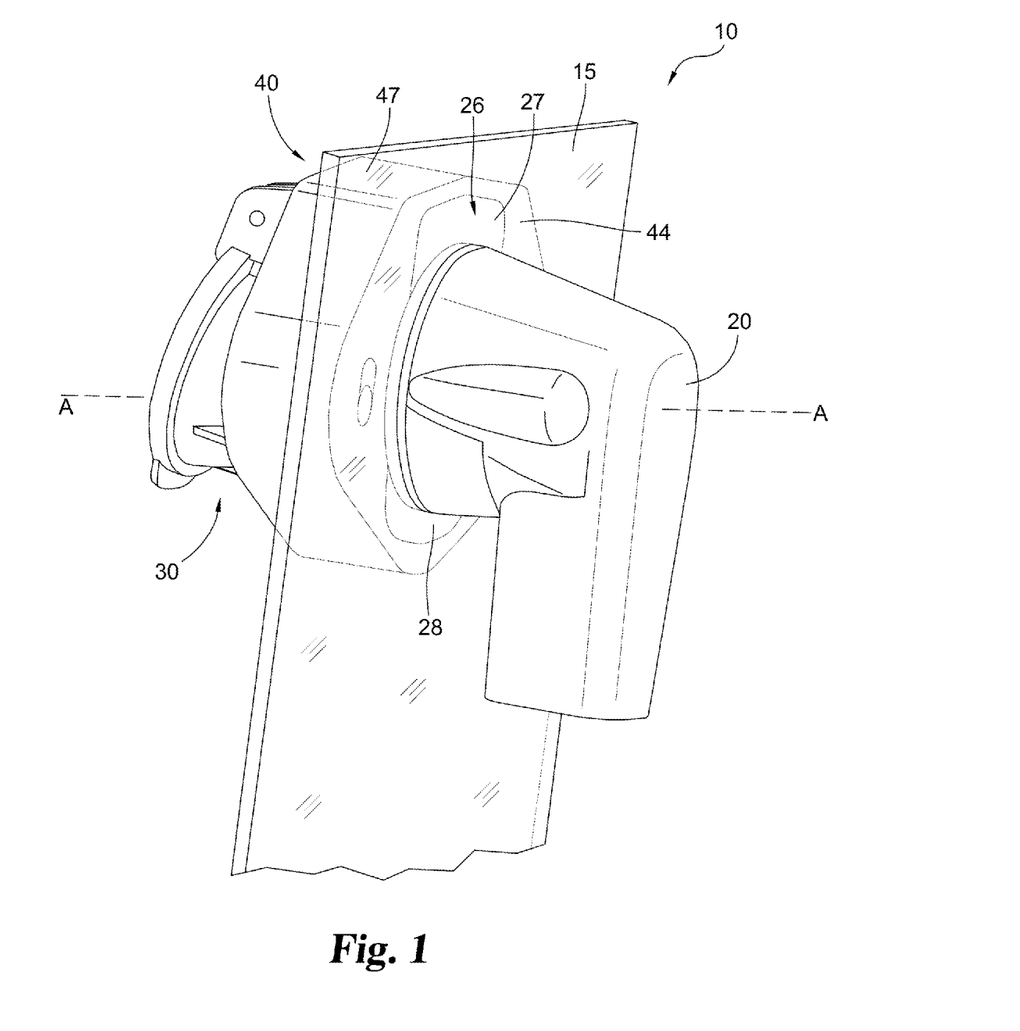
FIG. 1 is a rear perspective view of an electrical connection for providing an electro-mechanical connection through a hole in a wall of a wheeled vehicle.
Figure 2:
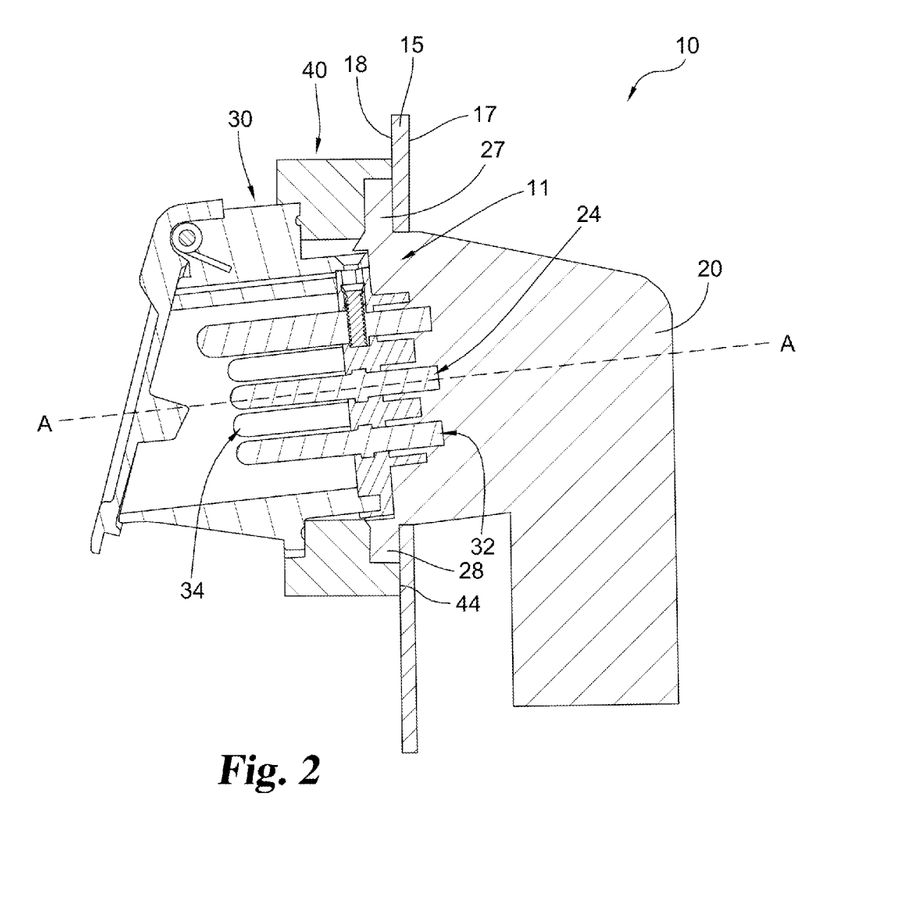
FIG. 2 is a side cross-sectional view of the electrical connection of FIG. 1.
Figure 3:
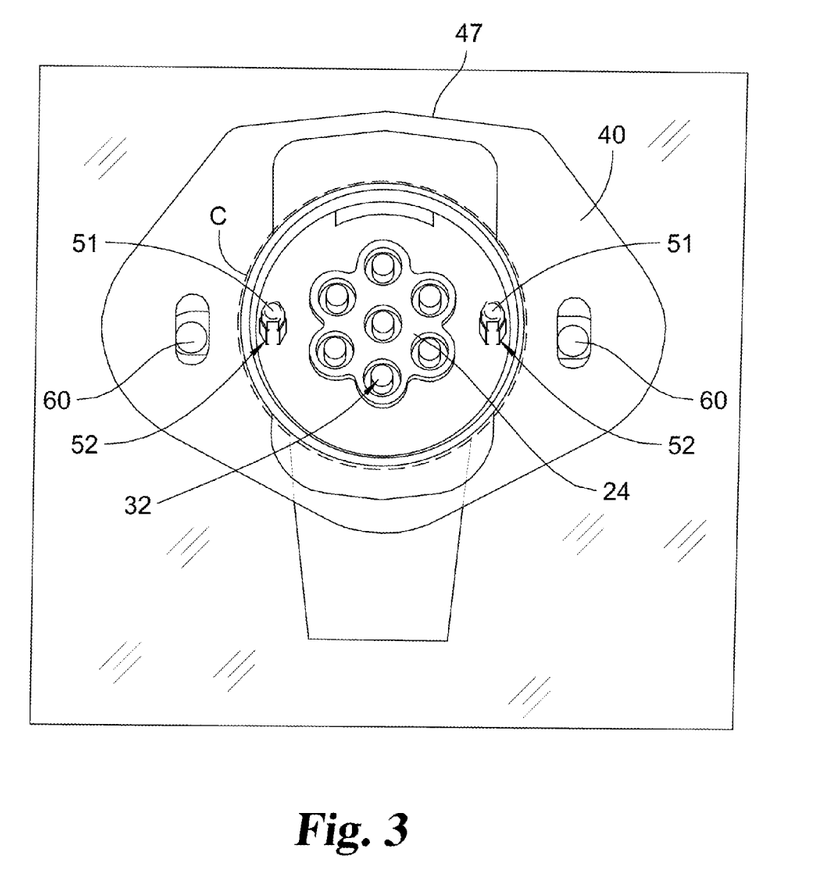
FIG. 3 is a front elevation view of the electrical connection plug and gasket of FIG. 1.
Figure 4:
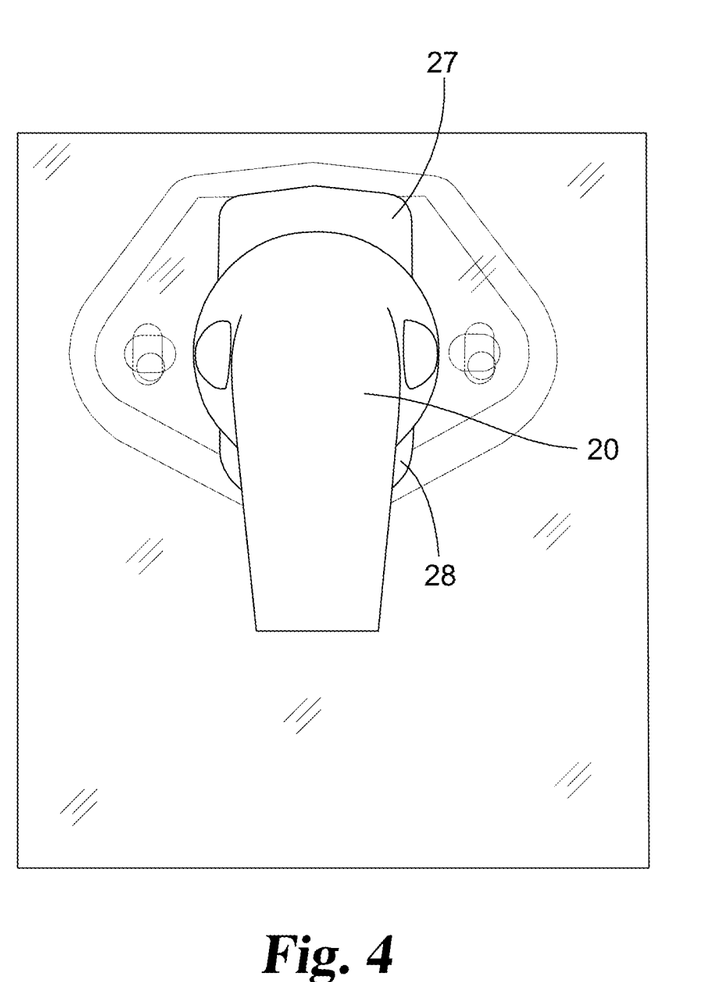
FIG. 4 is a rear elevation view of the device of FIG. 3.
Figure 5:
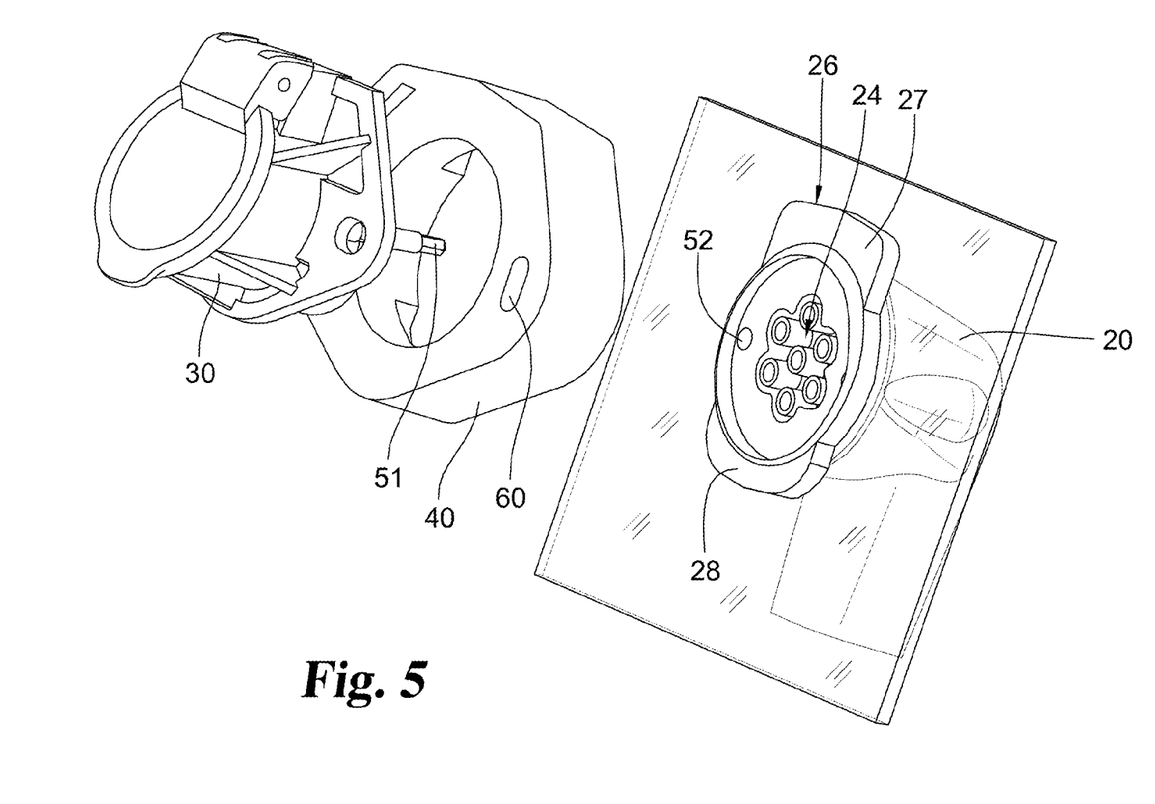
FIG. 5 is an exploded front perspective view of the electrical connection of FIG.
Figure 6:
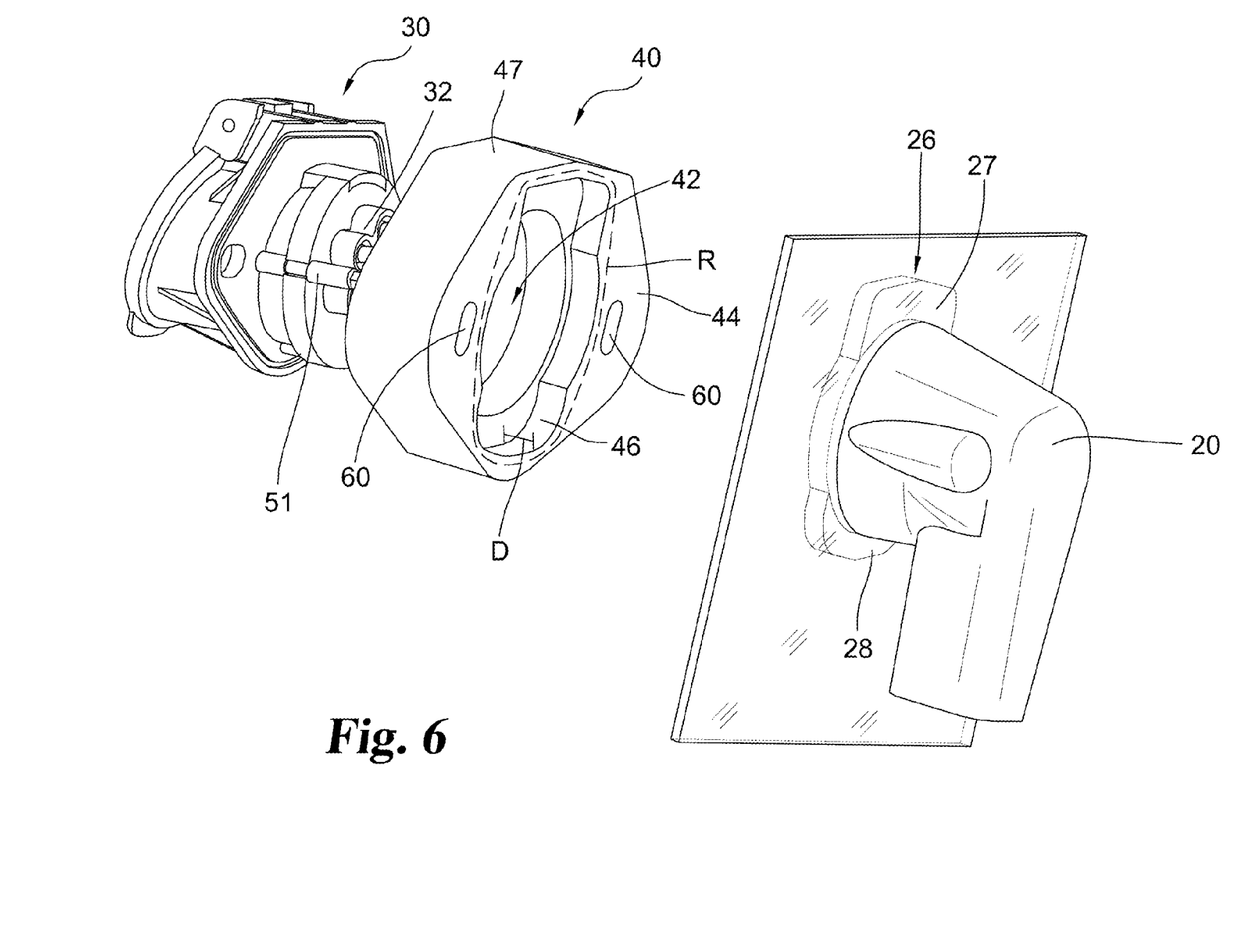
FIG. 6 is an exploded rear perspective view of the electrical connection of FIG. 1.
Figure 7:
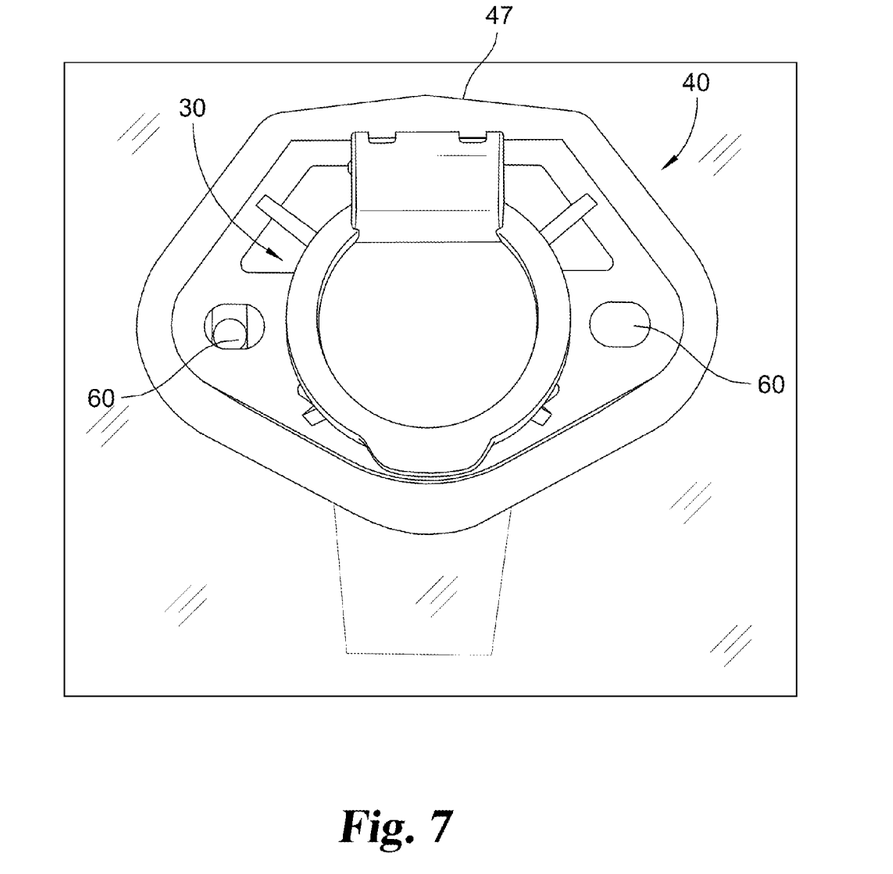
FIG. 7 is a front elevation view of the electrical connection of FIG. 1.

With reference to the drawing Figures, for example FIGS. 1-7, an electrical connection 10 adapted for providing an electro-mechanical connection through a hole 11 in a wall 15 of a wheeled vehicle is shown. The wall has an exterior side 18 and an opposite interior side 17. The electrical connection 10 is adapted to connect with an exterior cable (not shown) that includes a 6-around-1 female electrical connector array. The electrical connection 10 includes an interior cable (not shown, extending behind or below plug portion 20) that meets SAE standard J560 and which includes an interior plug portion 20. The interior plug portion 20 includes a 6-around-1 female electrical connector array 24. Also, the interior plug portion 20 includes a locking means 26 integrally formed with and radially extending from the interior plug portion 20. Locking means 26 is shown contacting exterior side 18 near hole 11.

A socket 30 that meets SAE standard J560 is adapted via a male exterior 6-around-1 electrical connector array 34 to provide an electrical connection to the exterior cable 6-around-1 female electrical connector array. The socket 30 is also adapted via an interior 6-around-1 male electrical connector array 32 to provide an electrical connection to the interior cable 6-around-1 female electrical connector array 24.

One feature that is optional, but not required may be a gasket member 40, separately formed from the interior plug portion 20, includes a circumferentially uninterrupted ring, (shown as dotted ring R in FIG. 6), around a central opening 42. The central opening 42 in the gasket member 40 is sized and shaped to receive through it a connection of the interior cable plug 20 and the socket 30. The gasket 40 also includes a substantially planar rear surface 44 adapted to contact and form an uninterrupted water seal with the exterior side of the wall 18. The gasket 40 further includes recessing 46 in the substantially planar rear surface 44 extending radially outward from the gasket member central opening 42. The recessing 46 is sized and shaped to receive the locking means 26. The recessing 46 has an axial depth D (see FIG. 6) greater than or equal to a corresponding axial depth of the locking means 26. The locking means 26 does not block the gasket member planar rear surface 44 from contacting and forming a water seal with the exterior wall 18 uninterrupted around the entire hole in the wall 15.

One feature that is optional, but not required may be that locking means 26 includes a first tab 27 and a second tab 28 located diametrically across from the first tab 27. Further optionally, one tab may be located at the top (twelve o'clock position) with the other at the bottom (six o'clock position); and, fewer or more tabs may be used as well. Other locking means may be used instead of or in addition to such tab examples. Optionally, the tabs may be stiff such that they are not deformable adequately to permit it to be passed through hole 11; and, optionally such stiffness is achieved by a high thickness (axial depth) such as, for example, 0.218 inches and/or being made of relatively stiff polymers. However, optionally, in another version the locking means could be modified to allow deformation through the hole.

One feature that is optional, but not required may be a first guide male member 51 adapted to slide axially into a first guide female member 52. The first guide male member 51 and the first guide female member 52 are located, prior to connection, axially between the interior plug portion 20 and the socket 30. Also, the first guide male member 51 and the first guide female member 52 are located radially outboard of the interior plug portion 6-around-1 array 24 and radially outboard of the socket's interior 6-around-1 array 32. Further, the first guide male member 51 and the first guide female member 52 are substantially parallel to the interior plug portion 6-around-1 array 24 and the socket's interior 6-around-1 array 32.

One feature that is optional, but not required may be that the first guide male member 51 is longer than its associated 6-around-1 electrical connector such that the first male guide member 51 begins insertion into the first female guide member 52 before the 6-around-1 electrical connector of the interior plug portion 24 contacts the 6-around-1 electrical connector 32 of the socket.

Another feature that is optional, but not required may be a second guide male member 51 adapted to slide axially into a second guide female member 52. The second guide male member 51 and the second guide female member 52 are located, prior to connection, axially between the interior plug portion 20 and the socket 30. Also, the second guide male member 51 and the second guide female member 52 are located radially outboard of the interior plug portion 6-around-1 array 24 and radially outboard of the socket's interior 6-around-1 array 32. Further, the second guide male member 51 and the second guide female member 52 are substantially parallel to the interior plug portion 6-around-1 array 24 and the socket's interior 6-around-1 array 32. The second guide male member 51 is longer than its associated 6-around-1 electrical connector such that the second male guide member 51 begins insertion into the second female guide member 52 before the 6-around-1 electrical connector of the interior plug 24 portion contacts the 6-around-1 electrical connector of the socket 32. Third, fourth and more guides may optionally be provided. The guide(s) may function to align the 6-around-1 arrays axially, along axis A-A, prior to contact between the arrays, thereby improving proper connection and thereby reducing chances of bending or other damage to the arrays.

One feature that is optional, but not required may be that the first guide male member 51 center is located radially inboard of a circle (shown in dashed lines in FIG. 3 as C) centered on the socket's interior 6-around-1 array 32 and has a diameter of about 2¼ inches. The same may be true for the second guide male member. This permits inserting the guide member(s) though hole 11 (which in the prior art such hole is typically 2¼ inch in diameter) without having to enlarge the hole or drill one or more other hole(s).

The connection using one or more guide members may be done with a device having gasket 40 or without it. By way of example, prior devices, such as those disclosed in one or more of U.S. Pat. Nos. 8,251,732; 8,192,216; 7,435,093; 6,743,025; 6,554,626; 6,483,200; 6,450,833; 5,302,141; may be modified to include one or more of the guide members. Optionally, as well or instead, such prior devices may be modified to have a gasket member 40 and locking means 26 as disclosed herein.

Another feature that is optional, but not required may be that the first and/or second guide male member 51 is located on the socket 30. However, another feature that is optional, but not required may be that the first and/or guide male member 51 is located on the interior plug portion 20. Those may be combined or mixed and matches, optionally, with one guide male member on the socket and the other(s) on the interior plug portion.

Another feature that is optional, but not required may be that the socket 30 and the interior plug 20 are connectable along a connection axis A-A that is sloped downwardly with respect to the wall of the wheeled vehicle. Optionally, however, that axis may instead be horizontal.

One feature that is optional, but not required may be that the top surface 47 of the gasket member 40 is sloped to shed water thereon. One feature that is optional, but not required may be that the gasket member 40 has a thickness that prevents the socket 30 from extending through the hole in the wall 15 of the wheeled vehicle.

One feature that is optional, but not required may be that the interior plug portion 20, including locking means 26, is made from a material that has a Shore durometer of at least 70 on the A scale. It may, for example, be molded from PVC; although other materials and/or composites may be used instead.

Typically, the connector, including gasket 40, is mounted to wall 15 via fasteners, such as two bolts, through aligned holes 60 in the socket and the gasket and the wall.

Optionally, the gasket, (made from PVC or otherwise), will have the same or similar shape as the flange on the J560 socket. And optionally, the gasket is hard enough, typically with a durometer hardness harder than plug portion 20 such that gasket member is not crushed or unduly deformed when such mounting bolts are tightened in holes 60.

Another optional feature is having gasket member 40

As used here (claims, specification, and other definitions) the following terms have the following meaning:

Articles and phases such as, "the", "a", "an", "at least one", and "a first", "comprising", "having" and "including" here are not limited to mean only one, but rather are inclusive and open ended to also include, optionally, two or more of such elements and/or other elements. In terms of the meaning of words or terms or phrases herein, literal differences therein are not superfluous and have different meaning, and are not to be synonymous with words or terms or phrases in the same or other claims.

The term "means for" in a claim invokes 35 U.S.C. §112(f), literally encompassing the recited function and corresponding structure and equivalents thereto. Its absence does not, unless there otherwise is insufficient structure recited for that claim element. Nothing herein or elsewhere restricts the doctrine of equivalents available to the patentee.

The term "and/or" is inclusive here, meaning "and" as well as "or". For example, "P and/or Q" encompasses, P, Q, and P with Q; and, such "P and/or Q" may include other elements as well.

The term "axial depth" means here a length or distance along a defined axis, where an axis is a fixed linear reference line.

The term "axially" means here relating to or forming an axis, wherein an axis is a fixed linear reference line, in this case axis A-A shown in the drawing figures and the axis along which the parts are moved with respect to each other to connect them together.

The term "central opening" means here an aperture, gap, or hollow portion of an object or structure that occurs within the outer boundaries of the object or structure. The opening may be, but is not required, to be located in the center of the object. It may be circular or non-circular.

The term "circumferentially uninterrupted ring" means here a part or surface that may be of any shape with an enclosing boundary that is continuous. It may be circular or non-circular, including circuitous around various openings, elements or obstructions.

The term "contact" means here a condition or state where at least two objects are physically touching. As used, contact requires at least one location where objects are directly or indirectly touching, with or without any other member(s) material in between.

The term "corresponding axial depth" means here the axial depth of an object or opening that is able to be matched or joined with another object or opening along a same axis.

The term "diametrically across" means here to be located in generally across an opening (in whole or in part) from another element.

The term "electrical connection" means here a connection between two objects that allows a flow of electric current and/or electric signals.

The term "electro-mechanical connection" means here an electrical connection achieved by mechanically joining two electrical conductors and/or joining surrounding mechanical elements (such as for example, plugs, sockets, boots, and/or otherwise). An electro-mechanical connection may be made in a variety of ways, including but not limited to, clamping or inserting a plug into a jack.

The term "female" means here a description of a structure that connects to another structure that includes hollow portions for receiving portions of a corresponding male connector.

The term "gasket member" means here an object designed to seal the junction between two surfaces. A gasket member may be a variety of shapes, for example, but not limited to, circular, square or hexagonal. A gasket member may be made of any material that is effective for sealing a junction between two materials, such as rubber, plastic, or other kinds of polymers. It may be unitary or non-unitary. It may be made of one material or more than one material.

The term "guide female member" means here an opening, recess, or hole designed to receive a corresponding male member.

The term "guide male member" means here a plug, pin, or any other projecting structure that is designed to fit into a corresponding female member.

The term "guide male member center" means here the middle axial point of the guide male member.

The term "hole" means here a hollow portion through a solid body, wall or a surface. A hole may be any shape. For example, a hole may be, but is not limited to, circular, triangular, or rectangular. A hole may also have varying depths and may extend entirely through the solid body or surface or may extend through only one side of the solid body.

The term "integrally formed" means here to be formed as or fused into a single piece without needing some form of connection or attachment.

The term "interior plug portion" means here either an electrical connector attached to a cable that is for use inside a wheeled vehicle, such as for example a trailer. The plug portion may be a female connector or a male connector.

The term "locking means" means here any device used to connect one object to another, (and/or inside a hole), and that holds the objects from being separated. This may include for example, tab(s), bayonet(s), thread(s), snap(s), detent(s), a flange, and/or combinations thereof.

The term "male" means here a description of a structure that connects to another structure that includes portions that fill or fit inside the hollow portion of a corresponding female connector.

The term "polymer" means here a material characterized by a molecular structure formed from the repetition of subunits bonded together. Examples include, but are not limited to, plastics or rubber.

The term "radially inboard" means here located closer to a defined center point than another reference object.

The term "radially outboard" means here located further away from a defined center point or axis than another reference object.

The term "radially outward" means here positioned at a greater distance from a defined center point or axis. An object may be extending radially outward if the object has a starting point at a given distance from the defined center or axis and then moves farther away from that center point or axis.

The term "recessing" means here a space, recess or divot in an object which is set back or indented from other portions or surfaces of the object. Recessing may have various shapes or forms.

The term "SAE standard J560" means here a set of (prior art) requirements for jumper cable plugs and receptacles for truck-trailers issued by the Society of Automotive Engineers, as of the effective filing date of this patent filing (hereby expressly incorporated by reference).

The term "separately formed" means here means formed as a separate part from another piece or device.

The term "6-around-1 electrical connector array" means here an arrangement of elements of an electrical connector that includes six elements surrounding a central element. The elements may be either electrical openings or electrical prong. As an example, the elements may be arranged so that the six outer elements are circular and equidistant from each other. In general, the elements of the 6-around-1 electrical connector array should be arranged as described in SAE standard J560.

The term "slide axially" means here to move along an axis and maintaining a position on that axis while moving.

The term "sloped downwardly with respect to the wall" means here oblique to a vertical wall or at an angle that is not perpendicular with respect to a vertical wall. The angle at which an object is sloped downwardly may vary as long as the angle is not perpendicular to the wall. The slope or angle may be straight, curved, compound or otherwise.

The term "sloped to shed water" means here a surface positioned at any non-horizontal curve and/or angle that causes water to flow off of it by gravity.

The term "socket" means here any hollow object into which another object may be fit. A socket may include attachment points for electrical connectors (male and/or female).

The term "socket from extending through the hole in the wall" means here that the structure of the socket does not extend past the interior side of a hole in the wall of a wheeled vehicle. The socket does not include any electrical connector that may be attached to the socket. For example, any pins, prongs, or other electrical connectors that project from the socket may extend further than the interior side of the wall and into the interior of a wheeled vehicle, but the structure of the socket does not extend past the interior side of a hole.

The term "substantially parallel" means here two lines, planes, or objects that extend in the same direction and are equidistant at all points so as not to converge. Small variations from being exactly parallel within the range of acceptable tolerance limits are allowed.

The term "substantially planar rear surface" means here a flat, two dimensional surface. Variations from perfectly flat or two-dimensional are allowed within acceptable tolerance limits and/or polymer deformation.

The term "tab" means here a projection, flap, or strip of material that extends from an object or structure.

The term "thickness" means here the measure of the distance between opposite sides of an object. As used here, the thickness of an object that is positioned between two surfaces is measured from between the two sides of the object that contact the surfaces.

The term "uninterrupted water seal" means here a connection between two objects that prevents water from entering the between the objects. To be uninterrupted, there is no portion of the connection between the two objects that allows water from entering the space between the two objects.

The term "unitary" means here a single, continuous entity formed without multiple pieces.

The term "wall" means here is structure that forms a solid surface. It may be a portion of a truck cab, trailer, nose-box, or otherwise. A wall may be planar or multiplanar and may be constructed of any of a variety of materials, including, but not limited to metal, concrete, or plastic.

The term "wheeled vehicle" means here a means of travel or transport that moves on wheels. Examples include, but are not limited to, trailers, semi-trucks, pickup trucks, vans, cars, or trains.

The invention may include any one or more articles or devices made by any of the claimed methods and/or may by different methods but with a claimed composition.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Webster's dictionaries and Random House dictionaries.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. An electrical connection adapted for providing an electro-mechanical connection through a hole in a wall of a wheeled vehicle with the wall having an exterior side and an opposite interior side, wherein the electrical connection is adapted to connect with an exterior cable that includes a 6-around-1 female electrical connector array, the electrical connection comprising:
    a) an interior cable that meets SAE standard J560 and which includes an interior plug portion which includes a 6-around-1 female electrical connector array, wherein said interior plug portion includes a locking means integrally formed with and radially extending from said interior plug portion; and,
    b) a socket that meets SAE standard J560 and that is:
        i) adapted via a male exterior 6-around-1 electrical connector array to provide an electrical connection to said exterior cable 6-around-1 female electrical connector array; and,
        ii) adapted via an interior 6-around-1 male electrical connector array to provide an electrical connection to said interior cable 6-around-1 female electrical connector array; and,
    c) a gasket member, separately formed from said interior plug portion, said gasket member including:
        (i) a circumferentially uninterrupted ring around a central opening therethrough, said opening in said gasket member sized and shaped to receive through it a connection of said interior cable plug and said socket;
        (ii) a substantially planar rear surface adapted to contact and form an uninterrupted water seal with the exterior side of the wall; and,
        (iii) recessing in said substantially planar surface extending radially outward from said gasket member central opening, wherein said recessing is sized and shaped to receive said locking means therein, wherein said recessing has an axial depth greater than or equal to a corresponding axial depth of said locking means, whereby said locking means does not block said gasket member planar rear surface from contacting and forming a water seal with the exterior wall uninterrupted around the entire hole in the wall.

2. The electrical connection of claim 1, wherein said locking means includes a first tab and a second tab located diametrically across from said first tab.

3. The electrical connection of claim 2, further comprising:
    (d) a first guide male member adapted to slide axially into a first guide female member, wherein said first guide male member and said first guide female member are:
        i) located, prior to connection, axially between said interior plug portion and said socket;
        ii) located radially outboard of said interior plug portion 6-around-1 array and radially outboard of said socket's interior 6-around-1 array; and,
        iii) substantially parallel to said interior plug portion 6-around-1 array and said socket's interior 6-around-1 array.

4. The electrical connection of claim 3, wherein said first guide male member is longer than its associated 6-around-1 electrical connector such that said first male guide member begins insertion into said first female guide member before said 6-around-1 electrical connector of said interior plug portion contacts said 6-around-1 electrical connector of said socket.

5. The electrical connection of claim 4, wherein said first guide male member center is located radially inboard of a circle centered on socket's interior 6-around-1 array and having a diameter of about 2¼ inches.

6. The electrical connection of claim 4, wherein said socket and said interior plug are connectable along a connection axis that is sloped downwardly with respect to the wall of the wheeled vehicle.

7. The electrical connection of claim 6, further comprising:
(d) a second guide male member adapted to slide axially into a second guide female member, wherein said second guide male member and said second guide female member are:
i) located, prior to connection, axially between said interior plug portion and said socket;
ii) located radially outboard of said interior plug portion 6-around-1 array and radially outboard of said socket's interior 6-around-1 array; and,
iii) substantially parallel to said interior plug portion 6-around-1 array and said socket's interior 6-around-1 array; and,
wherein, said second guide male member is longer than its associated 6-around-1 electrical connector such that said second male guide member begins insertion into said second female guide member before said 6-around-1 electrical connector of said interior plug portion contacts said 6-around-1 electrical connector of said socket.

8. The electrical connection of claim 7, wherein the top surface of said gasket member is sloped to shed water thereon.

9. The electrical connection of claim 8, wherein said gasket member has a thickness that prevents the said socket from extending through the hole in the wall of the wheeled vehicle.

10. The electrical connection of claim 3, wherein said first guide male member is located on said socket.

11. The electrical connection of claim 3, wherein said first guide male member is located on said interior plug portion.

12. The electrical connection of claim 1, further comprising:
(d) a first guide male member adapted to slide axially into a first guide female member, wherein said first guide male member and said first guide female member are:
i) located, prior to connection, axially between said interior plug portion and said socket;
ii) located radially outboard of said interior plug portion 6-around-1 array and radially outboard of said socket's interior 6-around-1 array; and,
iii) substantially parallel to said interior plug portion 6-around-1 array and said socket's interior 6-around-1 array.

13. The electrical connection of claim 12, wherein said first guide male member is longer than its associated 6-around-1 electrical connector such that said first male guide member begins insertion into said first female guide member before said 6-around-1 electrical connector of said interior plug portion contacts said 6-around-1 electrical connector of said socket.

14. The electrical connection of claim 12, wherein said first guide male member center is located radially inboard of a circle centered on socket's interior 6-around-1 array and having a diameter of about 2¼ inches.

15. The electrical connection of claim 1, wherein said socket and said interior plug are connectable along a connection axis that is sloped downwardly with respect to the wall of the wheeled vehicle.

16. The electrical connection of claim 12, further comprising:
(d) a second guide male member adapted to slide axially into a second guide female member, wherein said second guide male member and said second guide female member are:
i) located, prior to connection, axially between said interior plug portion and said socket;
ii) located radially outboard of said interior plug portion 6-around-1 array and radially outboard of said socket's interior 6-around-1 array; and,
iii) substantially parallel to said interior plug portion 6-around-1 array and said socket's interior 6-around-1 array; and,
wherein, said second guide male member is longer than its associated 6-around-1 electrical connector such that said second male guide member begins insertion into said second female guide member before said 6-around-1 electrical connector of said interior plug portion contacts said 6-around-1 electrical connector of said socket.

17. The electrical connection of claim 1, wherein said gasket member is a polymer and wherein said locking means is a polymer, and wherein said gasket has a hardness greater than a hardness of said locking means.

18. The electrical connection of claim 1, wherein said gasket member has a thickness that prevents the said socket from extending through the hole in the wall of the wheeled vehicle.

19. An electrical connection adapted for providing an electro-mechanical connection through a hole in a wall of a wheeled vehicle with the wall having an exterior side and an opposite interior side, wherein the electrical connection is adapted to connect with an exterior cable that includes a 6-around-1 female electrical connector array, the electrical connection comprising:
a) an interior cable that meets SAE standard J560 and which includes an interior plug portion which includes a 6-around-1 female electrical connector array, wherein said interior plug portion includes a locking means integrally formed with and radially extending from said interior plug portion; and,
b) a socket that meets SAE standard J560 and that is:
i) adapted via a male exterior 6-around-1 electrical connector array to provide an electro-mechanical connection to said exterior cable 6-around-1 female electrical connector array; and,
ii) adapted via an interior 6-around-1 male electrical connector array to provide an electro-mechanical connection to said interior cable 6-around-1 female electrical connector array; and,
c) a first guide male member adapted to slide axially into a first guide female member, wherein said first guide male member is located, prior to connection, axially between said interior plug portion and said socket, and wherein said first guide male member and said first guide female member are:
i) located radially outboard of said interior plug portion 6-around-1 array and radially outboard of said socket's interior 6-around-1 array; and,
ii) substantially parallel to said interior plug portion 6-around-1 array and said socket's interior 6-around-1 array.

20. The electrical connection of claim 19, wherein said first guide male member is longer than its associated 6-around-1 electrical connector such that said first male guide member begins insertion into said first female guide member before said 6-around-1 electrical connector of said interior plug portion contacts said 6-around-1 electrical connector of said socket.

21. The electrical connection of claim 20, wherein said first guide male member center is located radially inboard of a circle centered on socket's interior 6-around-1 array and having a diameter of about 2¼ inches.

22. The electrical connection of claim 19 wherein said socket and said interior plug are connectable along a connection axis that is sloped downwardly with respect to the wall of the wheeled vehicle.

23. The electrical connection of claim 19, further comprising:
  (d) a second guide male member adapted to slide axially into a second guide female member, wherein said second guide male member and said second guide female member are:
    i) located, prior to connection, axially between said interior plug portion and said socket;
    ii) located radially outboard of said interior plug portion 6-around-1 array and radially outboard of said socket's interior 6-around-1 array; and,
    iii) substantially parallel to said interior plug portion 6-around-1 array and said socket's interior 6-around-1 array; and,
  wherein, said second guide male member is longer than its associated 6-around-1 electrical connector such that said second male guide member begins insertion into said second female guide member before said 6-around-1 electrical connector of said interior plug portion contacts said 6-around-1 electrical connector of said socket.

24. The electrical connection of claim 19, further comprising a gasket member.

25. The electrical connection of claim 19, wherein said first guide male member is located on said socket.

26. The electrical connection of claim 19, wherein said first guide male member is located on said interior plug portion.

* * * * *